(12) United States Patent
Yamamoto et al.

(10) Patent No.: US 8,910,106 B2
(45) Date of Patent: Dec. 9, 2014

(54) CAPACITOR ARRANGEMENT ASSISTING METHOD AND CAPACITOR ARRANGEMENT ASSISTING DEVICE

(71) Applicant: Murata Manufacturing Co., Ltd., Nagaokakyo-Shi, Kyoto-fu (JP)

(72) Inventors: Hidetoshi Yamamoto, Nagaokakyo (JP); Yusuke Isozumi, Nagaokakyo (JP); Kota Saito, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 8 days.

(21) Appl. No.: 13/692,185

(22) Filed: Dec. 3, 2012

(65) Prior Publication Data

US 2013/0132922 A1    May 23, 2013

Related U.S. Application Data

(63) Continuation of application No. PCT/JP2011/002872, filed on May 24, 2011.

(30) Foreign Application Priority Data

Jun. 3, 2010 (JP) .................. 2010-128246

(51) Int. Cl.
- *G06F 17/50* (2006.01)
- *H05K 1/02* (2006.01)
- *H05K 3/00* (2006.01)

(52) U.S. Cl.
CPC ........ *G06F 17/5077* (2013.01); *G06F 17/5072* (2013.01); *H05K 1/0231* (2013.01); *H05K 1/025* (2013.01); *H05K 3/0005* (2013.01)
USPC .......... 716/127; 716/109; 716/111; 716/115; 716/120; 716/133

(58) Field of Classification Search
CPC ............ G06F 17/5068; G06F 17/5077; G06F 17/5081; G06F 2217/78; G06F 2217/12; G06F 2217/40; H05K 1/0231; H05K 3/0005; H05K 1/0216; H05K 2201/093; H05K 2201/09309
USPC .................. 716/109, 111, 115, 120, 127, 133
See application file for complete search history.

(56) References Cited

U.S. PATENT DOCUMENTS 6,405,346 B1 * 6/2002 Nawa ............................ 716/115
6,477,694 B1 * 11/2002 Irino et al. .................... 716/115

(Continued)

FOREIGN PATENT DOCUMENTS

| JP | 10-097560 A | 4/1998 |
|----|-------------|--------|
| JP | 2002-016337 A | 1/2002 |

(Continued)

OTHER PUBLICATIONS

PCT/JP2011/002872 Written Opinion dated Aug. 2, 2011.

(Continued)

*Primary Examiner* — Nha Nguyen
(74) *Attorney, Agent, or Firm* — Dickstein Shapiro LLP

(57) ABSTRACT

A capacitor arrangement assisting method wherein data entered by a user, such as the width w of a power supply wiring, the thickness h of a dielectric between the power supply wiring and a ground plane, the $ESL_{cap}$ of a capacitor, and a target frequency $f_T$ and a target impedance $Z_T$ of an IC, are received, the maximum allowable wiring length $l_{max}$ of the power supply wiring is calculated on the basis of the received width w of the power supply wiring, the thickness h of the dielectric, the $ESL_{cap}$ of the capacitor, and the target impedance $Z_T$ of the IC at the target frequency $f_T$, and the calculated maximum allowable wiring length $l_{max}$ is displayed.

8 Claims, 9 Drawing Sheets

(56) References Cited

U.S. PATENT DOCUMENTS

| | | | |
|---|---|---|---|
| 7,199,577 B1* | 4/2007 | Rahnavard | 324/548 |
| 7,412,683 B2 | 8/2008 | Mimura et al. | |
| 7,730,443 B2* | 6/2010 | Hsu et al. | 716/137 |
| 8,271,925 B2* | 9/2012 | Kobayashi | 716/122 |
| 8,321,827 B2* | 11/2012 | Sato | 716/120 |
| 2004/0139412 A1* | 7/2004 | Ito et al. | 716/8 |
| 2005/0149894 A1* | 7/2005 | Shimazaki et al. | 716/5 |
| 2006/0288317 A1* | 12/2006 | Hamada et al. | 716/5 |
| 2009/0234605 A1* | 9/2009 | Kashiwakura | 702/69 |
| 2009/0248343 A1 | 10/2009 | Kashiwakura | |
| 2011/0321000 A1* | 12/2011 | Fujimori | 716/136 |
| 2012/0059614 A1* | 3/2012 | Kashiwakura | 702/82 |

FOREIGN PATENT DOCUMENTS

| | | |
|---|---|---|
| JP | 2003-099494 A | 4/2003 |
| JP | 2005-321864 A | 11/2005 |
| JP | 2007-234853 A | 9/2007 |
| JP | 2007-299268 A | 11/2007 |
| JP | 2009-230694 A | 10/2009 |
| WO | WO-2005076163 A1 | 8/2005 |

OTHER PUBLICATIONS

Yaguchi, Power Integrity Design of Printed-Circuit Board, Journal of Japan Institute of Electronics Packaging, vol. 12, No. 3, 2009.

Kubodera, High Speed Digital Circuit Mounting Know-How, CQ Publishing Co., Ltd. 2002, Chapter 8.

* cited by examiner

TO ACHIEVE $Z_T = 2\ \Omega$ AND $f_T = 150$ MHz WITH WIRING SIZE OF w = 1 mm AND h = 0.4 mm
→ MEASURE AT POSITION OF 6 mm BASED ON CALCULATION RESULT OF $l$max, 6.6 mm

US 8,910,106 B2

CAPACITOR ARRANGEMENT ASSISTING METHOD AND CAPACITOR ARRANGEMENT ASSISTING DEVICE

CROSS REFERENCE TO RELATED APPLICATIONS

The present application is a continuation of International application No. PCT/JP2011/002872, filed May 24, 2011, which claims priority to Japanese Patent Application No. 2010-128246, filed Jun. 3, 2010, the entire contents of each of which are incorporated herein by reference.

FIELD OF THE INVENTION

The present invention relates to a capacitor arrangement assisting method and a capacitor arrangement assisting device.

BACKGROUND OF THE INVENTION

In digital circuits, in order to lower the power supply impedance of a digital IC (hereinafter, simply referred to as an "IC") and to remove noise, a decoupling capacitor (hereinafter, simply referred to as a "capacitor") is used on the periphery of a power supply terminal of the IC (for example, see Non-Patent Document 1). Normally, from the viewpoint of suppressing a voltage variation, it is desirable to have a lower power supply impedance, and it is thus desirable to have a lower impedance of the decoupling capacitor. Therefore, a capacitor having a sufficient electrostatic capacitance is used in accordance with a power supply impedance required by the IC. However, in a high-frequency range of several MHz or more, due to the influence of a minute equivalent series inductance (ESL (Equivalent Series Inductance)) of a capacitor (hereinafter, referred to as an "$ESL_{cap}$"), impedance is not lowered only with the electrostatic capacitance. Thus, a capacitor having a small $ESL_{cap}$ is suitable for a high-frequency range.

In addition, in the high-frequency range, apart from the $ESL_{cap}$, the inductance of a wiring that connects a power supply terminal of the IC with the capacitor (hereinafter, referred to as an "$ESL_{pcb}$") is also an issue (for example, see Non-Patent Document 2). Thus, normally, as illustrated in FIG. 13, with the boundary at several MHz (in FIG. 13, approximately 4.3 MHz), the power supply impedance tends to decrease as the frequency increases in accordance with the electrostatic capacitance of the capacitor in a lower-frequency side and the power supply impedance tends to increase as the frequency increases in a higher-frequency side. The above-described $ESL_{cap}$ and the $ESL_{pcb}$ are main factors which cause the increase of the impedance in the high-frequency side. Thus, in order to achieve a lower power supply impedance in the high-frequency range of several MHz or more, the $ESL_{cap}$ and the $ESL_{pcb}$ need to be decreased.

Non-Patent Document 1: Takahiro Yaguchi, "Purintohaisenban no pawainteguritei sekkei (Power Integrity Design of PCB)," Journal of Japan Institute of Electronics Packaging, vol. 12, No. 3, 2009.

Non-Patent Document 2: Tadashi Kubodera, "Kousoku dejitarukairo jissou nouhau (High-Speed Digital Circuit Mounting Know-How)," CQ Publishing Co., Ltd., 2002, Chapter 8.

SUMMARY OF THE INVENTION

Since the inductance $ESL_{pcb}$ of a wiring cannot be derived from a simple calculation, the inductance $ESL_{pcb}$ of a wiring is an obstacle to designing for achieving a power supply impedance having a target value (hereinafter, referred to as a "target impedance") or less. Furthermore, for designing for achieving the power supply impedance having the target impedance or less, the arrangement of a capacitor is also an issue. This is because, since the shape of a wiring that connects an IC with a capacitor varies depending on the arrangement of the capacitor, the $ESL_{pcb}$ also varies.

Thus, in a conventional method, after the arrangement of a capacitor is once determined, the power supply impedance is calculated. If the power supply impedance does not achieve the target impedance, the arrangement of the capacitor is changed, and the power supply impedance is calculated again. This method needs such a process of trial and error. Furthermore, appropriately changing the arrangement of a capacitor as described above needs a mature technique. Thus, these factors impede the reduction of the development period of electronic circuit boards and the reduction of the cost. Under such circumstances, a technique capable of setting an appropriate arrangement of a capacitor more easily without a process of trial and error has been desired.

The present invention has been made to solve the above-mentioned problems. An object of the present invention is to provide a capacitor arrangement assisting method and a capacitor arrangement assisting device that are capable of setting an appropriate arrangement of a capacitor more easily without a process of trial and error.

A capacitor arrangement assisting method according to the present invention includes a unit inductance calculating step of calculating, on the basis of the width of a power supply wiring that connects a power supply terminal of an IC with a capacitor and the thickness of a dielectric provided between the power supply wiring and a ground plane, an inductance per unit length of the power supply wiring; and a wiring length acquiring step of acquiring a wiring length of the power supply wiring that allows a synthetic impedance of an impedance, which is calculated from an inductance of the power supply wiring set in accordance with the inductance per unit length of the power supply wiring and the wiring length of the power supply wiring, and an impedance of the capacitor, to be smaller than or equal to a target impedance of the IC at a target frequency.

In addition, a capacitor arrangement assisting device according to the present invention includes unit inductance calculating means for calculating, on the basis of the width of a power supply wiring that connects a power supply terminal of an IC with a capacitor and the thickness of a dielectric provided between the power supply wiring and a ground plane, an inductance per unit length of the power supply wiring; and wiring length acquiring means for acquiring a wiring length of the power supply wiring that allows a synthetic impedance of an impedance, which is calculated from an inductance of the power supply wiring set in accordance with the inductance per unit length of the power supply wiring and the wiring length of the power supply wiring, and an impedance of the capacitor, to be smaller than or equal to a target impedance of the IC at a target frequency.

In the capacitor arrangement assisting method or the capacitor arrangement assisting device according to the present invention, the inductance per unit length of the power supply wiring is calculated on the basis of the width of the power supply wiring and the thickness of the dielectric provided between the power supply wiring and the ground plane. Thus, the inductance of the power supply wiring can be calculated easily without advanced simulation. Furthermore, the wiring length of the power supply wiring that allows the synthetic impedance of the impedance, which is calculated from the inductance of the power supply wiring set in accordance with the inductance per unit length of the power supply wiring and the wiring length of the power supply wiring, and the impedance of the capacitor, to be smaller than or equal to the target impedance of the IC at the target frequency, is acquired. That is, the arrangement can be set after a range in which the capacitor can be arranged is understood. Thus, an appropriate arrangement of the capacitor can be set more easily without a process of trial and error. Consequently, the development period of a circuit board on which the capacitor is to be mounted can be reduced, and the development cost can thus be reduced.

In the capacitor arrangement assisting method according to the present invention, it is preferable that in the unit inductance calculating step, the inductance $L_0$ (H/m, the same applies to the below)) per unit length of the power supply wiring is calculated using equation (1):

$$L_0 = \frac{\mu_0}{\pi}\left(\frac{h}{w}\right)^{0.6}, \quad (1)$$

where h (m, the same applies to the below)) represents the thickness of the dielectric, w (m, the same applies to the below)) represents the width of the power supply wiring, and $\mu_0$ represents the permeability of a vacuum.

In the capacitor arrangement assisting device according to the present invention, it is preferable that the unit inductance calculating means calculates the inductance $L_0$ per unit length of the power supply wiring using equation (1):

$$L_0 = \frac{\mu_0}{\pi}\left(\frac{h}{w}\right)^{0.6}, \quad (1)$$

where h represents the thickness of the dielectric, w represents the width of the power supply wiring, and $\mu_0$ represents the permeability of a vacuum.

In each case, with the relatively simple equation (1), the inductance $L_0$ per unit length of the power supply wiring can be calculated. Thus, the inductance of the power supply wiring can be calculated more easily without advanced simulation.

In the capacitor arrangement assisting method according to the present invention, it is preferable that in the unit inductance calculating step, the inductance $L_0$ per unit length of the power supply wiring is calculated using equation (2):

$$L_0 = \frac{\mu_0}{\pi}\sqrt{\frac{h}{w}}, \quad (2)$$

where h represents the thickness of the dielectric, w represents the width of the power supply wiring, and $\mu_0$ represents the permeability of a vacuum.

In addition, in the capacitor arrangement assisting device according to the present invention, it is preferable that the unit inductance calculating means calculates the inductance $L_0$ per unit length of the power supply wiring using equation (2):

$$L_0 = \frac{\mu_0}{\pi}\sqrt{\frac{h}{w}}, \quad (2)$$

where h represents the thickness of the dielectric, w represents the width of the power supply wiring, and $\mu_0$ represents the permeability of a vacuum.

In each case, since an advanced power arithmetic operation is not required, the inductance per unit length of the power supply wiring can be calculated more easily.

In the capacitor arrangement assisting method according to the present invention, it is preferable that the impedance of the capacitor is calculated on the basis of an equivalent series inductance of the capacitor.

In addition, in the capacitor arrangement assisting device according to the present invention, it is preferable that the impedance of the capacitor is calculated on the basis of an equivalent series inductance of the capacitor.

Accordingly, since the impedance of the capacitor can be calculated only in view of the equivalent series inductance ($ESL_{cap}$), an arithmetic operation can be performed more easily.

A capacitor arrangement assisting method according to the present invention includes an input step of receiving input of the width of a power supply wiring that connects a power supply terminal of an IC with a capacitor, the thickness of a dielectric provided between the power supply wiring and a ground plane, an impedance of the capacitor, and a target impedance of the IC at a target frequency; a maximum allowable wiring length calculating step of calculating a maximum allowable wiring length $l_{max}$ (m, the same applies to the below) of the power supply wiring, using equation (3), on the basis of the width w of the power supply wiring, the thickness h of the dielectric, the impedance $Z_C$ ($\Omega$, the same applies to the below) of the capacitor, and the target impedance $Z_T$ ($\Omega$, the same applies to the below) of the IC at the target frequency $f_T$ (Hz, the same applies to the below), which are input in the input step:

$$l_{max} = \frac{Z_T - Z_c}{2\pi f_T \frac{\mu_0}{\pi}\left(\frac{h}{w}\right)^{0.6}}, \quad (3)$$

where $\mu_0$ represents the permeability of a vacuum; and a display step of displaying the maximum allowable wiring length calculated in the maximum allowable wiring length calculating step.

In addition, a capacitor arrangement assisting device according to the present invention includes input means for receiving input of the width of a power supply wiring that connects a power supply terminal of an IC with a capacitor, the thickness of a dielectric provided between the power supply wiring and a ground plane, an impedance of the capacitor, and a target impedance of the IC at a target frequency; maximum allowable wiring length calculating means for calculating a maximum allowable wiring length $l_{max}$ of the power supply wiring, using equation (3), on the basis of the width w of the power supply wiring, the thickness h of the dielectric, the impedance $Z_C$ of the capacitor, and the target impedance $Z_T$ of the IC at the target frequency $f_T$, which are input by the input means:

$$l_{max} = \frac{Z_T - Z_c}{2\pi f_T \frac{\mu_0}{\pi} \left(\frac{h}{w}\right)^{0.6}}, \quad (3)$$

where $\mu_0$ represents the permeability of a vacuum; and display means for displaying the maximum allowable wiring length calculated by the maximum allowable wiring length calculating means.

In the capacitor arrangement assisting method or the capacitor arrangement assisting device according to the present invention, when specific data including the width of the power supply wiring, the thickness of the dielectric and others are input, the maximum allowable wiring length of the power supply wiring, that is, a range in which the capacitor can be arranged, can be directly calculated using equation (3), and displayed. Thus, an appropriate arrangement of the capacitor can be set more easily without a process of trial and error. Consequently, the development period of a circuit board on which the capacitor is to be mounted can be reduced, and the development cost can thus be reduced.

In the capacitor arrangement assisting method according to the present invention, it is preferable that in the maximum allowable wiring length calculating step, the maximum allowable wiring length $l_{max}$ is calculated using equation (4), instead of equation (3):

$$l_{max} = \frac{Z_T - Z_c}{2\pi f_T \frac{\mu_0}{\pi} \sqrt{\frac{h}{w}}} \quad (4)$$

In the capacitor arrangement assisting device according to the present invention, it is preferable that the maximum allowable wiring length calculating means calculates the maximum allowable wiring length $l_{max}$ using equation (4), instead of equation (3):

$$l_{max} = \frac{Z_T - Z_c}{2\pi f_T \frac{\mu_0}{\pi} \sqrt{\frac{h}{w}}} \quad (4)$$

In each case, since an advanced power arithmetic operation is not required, the maximum allowable wiring length can be acquired more easily.

In the capacitor arrangement assisting method according to the present invention, it is preferable that in the maximum allowable wiring length calculating step, the maximum allowable wiring length is calculated based on equation (5):

$$\frac{1}{2\pi \frac{\mu_0}{\pi}} = 0.4 \times 10^6, \quad (5)$$

where $\mu_0$ represents the permeability of a vacuum ($4\pi \times 10^{-7}$).

In addition, in the capacitor arrangement assisting device according to the present invention, it is preferable that the maximum allowable wiring length calculating means calculates the maximum allowable wiring length based on equation (5):

$$\frac{1}{2\pi \frac{\mu_0}{\pi}} = 0.4 \times 10^6, \quad (5)$$

where $\mu_0$ represents the permeability of a vacuum ($4\pi \times 10^{-7}$).

Accordingly, since an arithmetic operation for calculating the maximum allowable wiring length is more simplified, an arithmetic operation can be performed more easily.

In the capacitor arrangement assisting method according to the present invention, it is preferable that in the maximum allowable wiring length calculating step, the maximum allowable wiring length is calculated on the basis of the impedance $Z_C$ of the capacitor using equation (6):

$$Z_C = 2\pi f \text{ESL}_{cap} \quad (6),$$

where $\text{ESL}_{cap}$ represents an equivalent series inductance of the capacitor.

In addition, in the capacitor arrangement assisting device according to the present invention, it is preferable that the maximum allowable wiring length calculating means calculates the maximum allowable wiring length on the basis of the impedance $Z_C$ of the capacitor using equation (6):

$$Z_C = 2\pi f \text{ESL}_{cap} \quad (6).$$

where $\text{ESL}_{cap}$ represents an equivalent series inductance of the capacitor.

Accordingly, since the maximum allowable wiring length can be calculated only in view of the equivalent series inductance ($\text{ESL}_{cap}$) regarding the impedance of the capacitor, an arithmetic operation can be performed more easily.

According to the present invention, an appropriate arrangement of a capacitor can be set more easily without a process of trial and error.

DESCRIPTION OF THE PREFERRED EMBODIMENTS

Hereinafter, preferred embodiments of the present invention will be explained in detail with reference to the drawings. In each of the drawings, the same elements are referred to with the same reference signs and redundant explanations will be omitted.

First Embodiment

Figure 1:
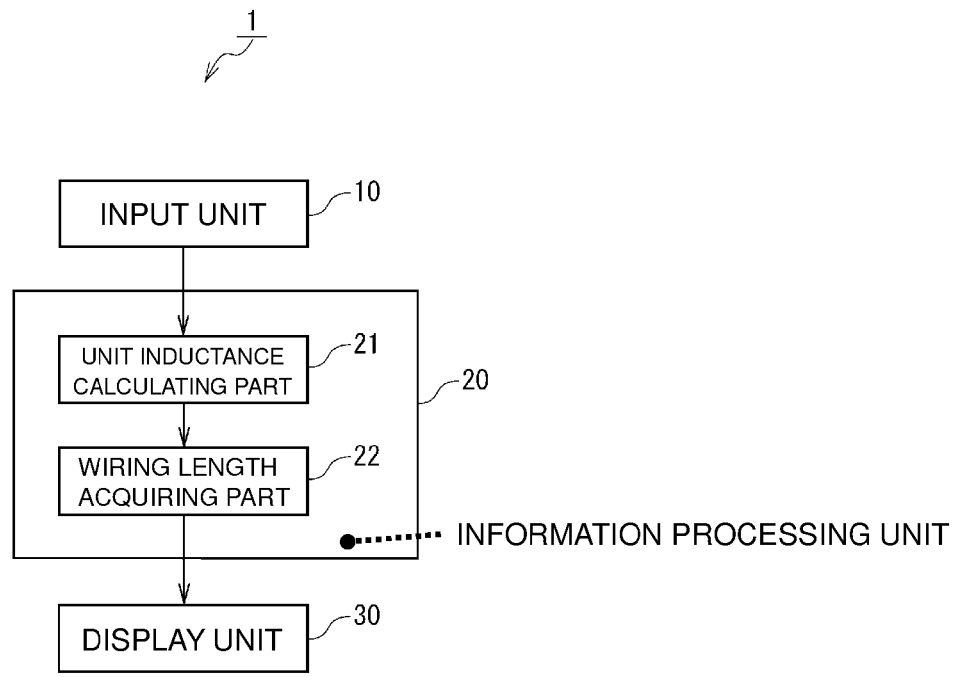
FIG. 1 is a block diagram illustrating the configuration of a capacitor arrangement assisting device according to a first embodiment.

First, referring to FIG. 1, the configuration of a capacitor arrangement assisting device 1 according to a first embodiment will be explained. FIG. 1 is a block diagram illustrating the configuration of the capacitor arrangement assisting device 1.

The capacitor arrangement assisting device 1 assists designing of a circuit board by presenting a range in which a decoupling capacitor can be arranged (power supply wiring length) so as to achieve a target impedance or less, on the basis of specific data, such as the width of a power supply wiring and the thickness of a dielectric between the power supply wiring and a ground plane. To this end, the capacitor arrangement assisting device 1 includes an input unit 10, an information processing unit 20, and a display unit 30. The information processing unit 20 includes a unit inductance calculating part 21 and a wiring length acquiring part 22. Hereinafter, the configuration of each of the units will be explained in detail.

Figure 2:
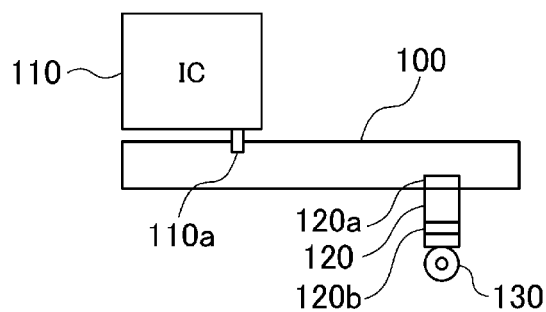
FIG. 2 illustrates an example of a power supply wiring.
Figure 3:
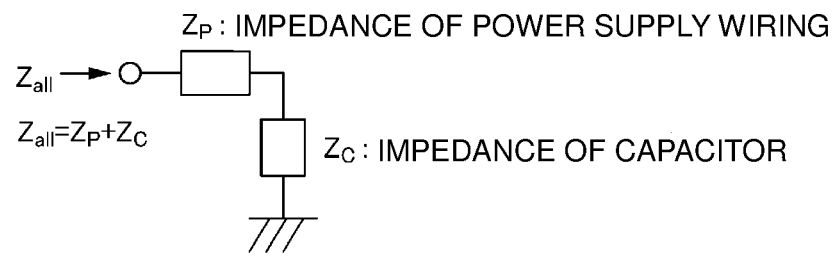
FIG. 3 is a diagram for explaining synthetic impedance.

Here, the case where a capacitor 120 is arranged on a power supply wiring 100 illustrated in FIG. 2 will be explained as an example. The power supply wiring 100 is formed of, for example, copper foil or the like. The power supply wiring 100 is formed in a microstrip line shape for the ground plane with the dielectric (board) therebetween. The width of the power supply wiring 100 is represented by w, and the thickness of the dielectric provided between the power supply wiring 100 and the ground plane (the distance in the board thickness direction between the power supply wiring 100 and the ground plane) is represented by h. A power supply terminal 110a of a digital IC 110 and a first terminal 120a of the capacitor 120 are connected with the power supply wiring 100. A second terminal 120b of the capacitor 120 is connected with the ground plane with a via 130 therebetween.

The capacitor 120 supplies electric power necessary for the operation of the IC 110 and removes noise intruding via the power supply wiring 100 and noise generated by the operation of the IC 110. Here, the capacitor 120 has an electrostatic capacitance large enough to lower the impedance in a low-frequency range of several MHz or less and has an $ESL_{cap}$ that impedes the reduction of the impedance in a high-frequency range of several MHz or more. In addition, a target impedance $Z_T$ that is required for the power supply of the IC 110 and an upper-limit frequency that achieves the target impedance $Z_T$ (target frequency $f_T$) are disclosed in advance.

The input unit 10 includes, for example, a keyboard or a touch panel. The input unit 10 receives data entered by a user, such as the width w (m, the same applies to the below) of the power supply wiring 100, the thickness h (m, the same applies to the below) of the dielectric between the power supply wiring 100 and the ground plane, the impedance $Z_C$ ($\Omega$, the same applies to the below) of the capacitor 120 (or the $ESL_{cap}$ (H, the same applies to the below), and the target frequency $f_T$ (Hz, the same applies to the below) and the target impedance $Z_T$ ($\Omega$, the same applies to the below) of the IC 110. These data may be entered and stored in a memory in advance.

The information processing unit 20 calculates a range in which the capacitor 120 can be arranged (wiring length) in accordance with an arithmetic expression on the basis of the data, such as the width w of the power supply wiring 100 and the thickness h of the dielectric, received from the input unit 10. The information processing unit 20 includes a microprocessor that performs arithmetic processing for received input data, a ROM that stores a program (including an arithmetic expression) for causing the microprocessor to execute individual processing and data, a RAM that temporarily stores various data such as arithmetic results, and the like. In the information processing unit 20, when the program stored in the ROM is executed by the microprocessor, functions of the unit inductance calculating part 21 and the wiring length acquiring part 22 are implemented.

The unit inductance calculating part 21 calculates the inductance $L_0$ (H/m, the same applies to the below) per unit length of the power supply wiring 100, using equation (1), on the basis of the cross-section size of the power supply wiring 100 that connects the power supply terminal 110a of the IC 110 with the capacitor 120, that is, the width w of the power supply wiring 100 and the thickness h of the dielectric:

$$L_0 = \frac{\mu_0}{\pi}\left(\frac{h}{w}\right)^{0.6}, \qquad (1)$$

where $\mu_0$ represents the permeability of a vacuum.

That is, the unit inductance calculating part 21 functions as a unit inductance calculating means. The calculated inductance $L_0$ per unit length of the power supply wiring 100 is output to the wiring length acquiring part 22.

The wiring length acquiring part 22 calculates a synthetic impedance (hereinafter, also referred to as a "power supply impedance") $Z_{all}$ ($\Omega$, the same applies to the below) of the impedance $Z_P$, which is calculated on the basis of the inductance of the power supply wiring 100 set in accordance with the inductance $L_0$ per unit length of the power supply wiring 100 and the wiring length l (m, the same applies to the below) of the power supply wiring 100, and the impedance $Z_C$ of the capacitor 120. The wiring length acquiring part 22 also acquires the wiring length l of the power supply wiring 100 that allows the calculated synthetic impedance $Z_{all}$ to be smaller than or equal to the target impedance $Z_T$ of the IC 110 at the target frequency $f_T$. That is, the wiring length acquiring part 22 functions as a wiring length acquiring means. This will be explained later in more detail.

A high-frequency portion of the power supply impedance $Z_{all}$ ($\Omega$, the same applies to the below) of the IC 110 can be approximated with the impedance obtained by series connection of the impedance $Z_P$ ($\Omega$, the same applies to the below) of the power supply wiring 100, which connects the IC 110 with the capacitor 120, with the impedance $Z_C$ of the capacitor 120. Here, when the capacitor 120 is connected, in a high-frequency range in which the length of the power supply wiring 100 is sufficiently shorter than the wavelength, the impedance $Z_P$ of the power supply wiring 100 can be approximated with a value obtained by multiplying the inductance $L_0$ per unit length of the power supply wiring 100 by the wiring length l (m, the same applies to the below) of the power supply wiring 100. This is because the capacitor 120 is considered to be short-circuited in a high-frequency range of several MHz or more.

Thus, when the power supply impedance $Z_{all}$ is calculated only in view of the magnitude of the impedance, based on equation (1), a result is obtained as equation (7):

$$Z_{all} = Z_p + Z_c \qquad (7)$$

$$= 2\pi fl \frac{\mu_0}{\pi} \left(\frac{h}{w}\right)^{0.6} + Z_c$$

When the wiring length of the power supply wiring 100 (the distance between the capacitor 120 and the power supply terminal 110a of the IC 110) l is obtained by transforming equation (7), a result is obtained as equation (8):

$$l = \frac{Z_{all} - Z_c}{2\pi f \frac{\mu_0}{\pi} \left(\frac{h}{w}\right)^{0.6}} \qquad (8)$$

As is clear from equation (8), in order to make the power supply impedance $Z_{all}$ to be smaller than the target impedance $Z_T$ at the target frequency $f_T$, the wiring length l of the power supply wiring 100 is set to be smaller than or equal to the maximum allowable wiring length $l_{max}$ (m, the same applies to the below) in equation (3):

$$l_{max} = \frac{Z_T - Z_c}{2\pi f_T \frac{\mu_0}{\pi} \left(\frac{h}{w}\right)^{0.6}} \qquad (3)$$

Figure 4:
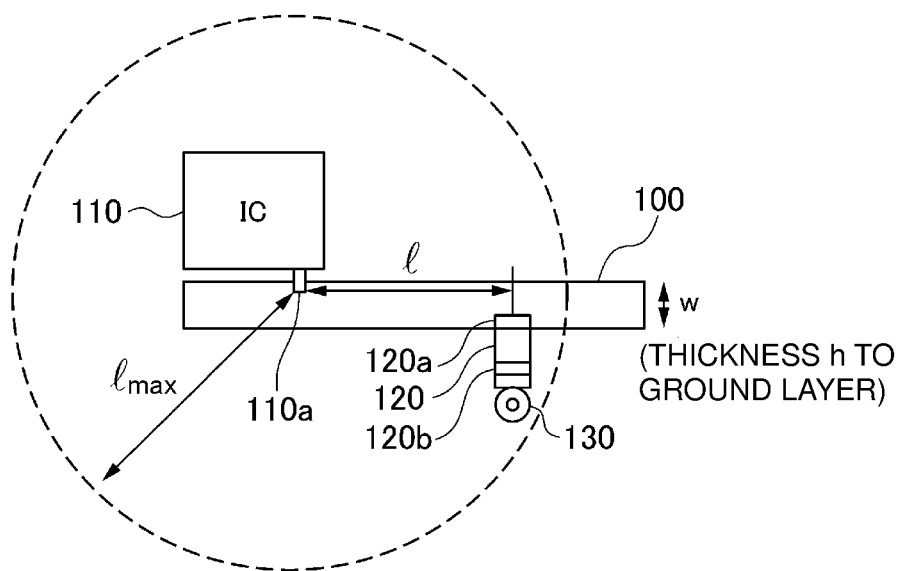
FIG. 4 is a diagram illustrating the maximum allowable wiring length of the power supply wiring.

That is, as illustrated in FIG. 4, by setting the wiring length l of the power supply wiring 100 to be smaller than or equal to the maximum allowable wiring length $l_{max}$ calculated using equation (3), the arrangement of the capacitor 120 can be set in such a manner that the power supply impedance is smaller than or equal to the target impedance $Z_T$.

Here, when a value ($4\pi \times 10^{-7}$) is substituted for $\mu_0$, the obtained value is expressed as a round number, and equation (3) is simplified, equation (9) is obtained:

$$l_{max} \cong 0.4 \frac{Z_T - Z_c}{f_T \left(\frac{h}{w}\right)^{0.6}} \times 10^6 \qquad (9)$$

In addition, in a high-frequency range of several MHz or more, since the impedance $Z_C$ of the capacitor 120 is considered to be governed by the $ESL_{cap}$ (H, the same applies to the below), the impedance $Z_C$ can be represented by equation (6):

$$Z_C = 2\pi f ESL_{cap} \qquad (6)$$

Here, when equation (6) is reflected in equation (3), equation (10) is obtained:

$$l_{max} = \frac{Z_T - 2\pi f_T ESL_{cap}}{2\pi f_T \frac{\mu_0}{\pi} \left(\frac{h}{w}\right)^{0.6}} \qquad (10)$$

Meanwhile, when equation (6) is reflected in equation (9), equation (11) is obtained:

$$l_{max} \cong 0.4 \frac{Z_T - 2\pi f_T ESL_{cap}}{f_T \left(\frac{h}{w}\right)^{0.6}} \times 10^6 \qquad (11)$$

Thus, also by calculating the maximum allowable wiring length $l_{max}$ using equation (9), (10), or (11), which is a more simplified equation, instead of equation (3), and arranging the capacitor 120 in such a manner that the wiring length l of the power supply wiring 100 is smaller than or equal to the maximum allowable wiring length $l_{max}$, the power supply impedance can be designed to be smaller than or equal to the target impedance $Z_T$. The calculated maximum allowable wiring length $l_{max}$ is output to the display unit 30.

The display unit 30 includes, for example, an LCD display or the like. The display unit 30 displays input data received by the input unit 10 and calculation results, such as the maximum allowable wiring length $l_{max}$.

Figure 5:
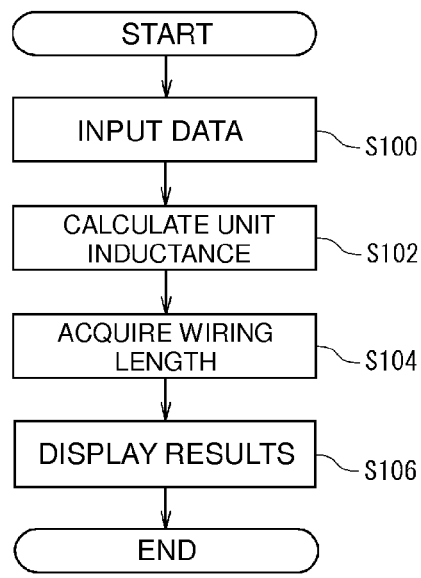
FIG. 5 is a flowchart illustrating the processing procedure of a wiring length acquiring process by the capacitor arrangement assisting device according to the first embodiment.

The operation of the capacitor arrangement assisting device 1 and a capacitor arrangement assisting method will now be explained with reference to FIG. 5. FIG. 5 is a flowchart illustrating the processing procedure of a wiring length acquiring process by the capacitor arrangement assisting device 1.

In step S100, data entered by a user, such as the width w of the power supply wiring 100, the thickness h of the dielectric between the power supply wiring 100 and the ground plane, the impedance $Z_C$ of the capacitor 120 (or the $ESL_{cap}$), and the target frequency $f_T$ and the target impedance $Z_T$ of the IC 110, are received.

In step S102 (corresponding to a unit inductance calculating step), the inductance $L_0$ per unit length of the power supply wiring 100 is calculated, using equation (1), on the basis of the width w of the power supply wiring 100, which connects the power supply terminal 110a of the IC 110 with the capacitor 120, and the thickness h of the dielectric, which are received in step S100:

$$L_0 = \frac{\mu_0}{\pi} \left(\frac{h}{w}\right)^{0.6} \qquad (1)$$

In step S104 (corresponding to a wiring length acquiring step), first, a synthetic impedance (power supply impedance) $Z_{all}$ of the impedance $Z_P$, which is calculated from the inductance of the power supply wiring 100 set in accordance with the inductance $L_0$ per unit length of the power supply wiring 100 calculated in step S102 and the wiring length l of the power supply wiring 100, and the impedance $Z_C$ of the capacitor 120 is calculated. Then, the wiring length l of the power supply wiring 100 that allows the calculated synthetic impedance $Z_{all}$ to be smaller than or equal to the target impedance $Z_T$ of the IC 110 at the target frequency $f_T$ is acquired.

More specifically, first, when the synthetic impedance $Z_{all}$ is calculated on the basis of the inductance $L_0$ per unit length of the power supply wiring 100 (equation (1)), equation (7) is obtained:

$$Z_{all} = Z_p + Z_c = 2\pi fl \frac{\mu_0}{\pi} \left(\frac{h}{w}\right)^{0.6} + Z_c \qquad (7)$$

Next, when equation (7) is transformed to calculate the wiring length l of the power supply wiring 100, equation (8) is obtained:

$$l = \frac{Z_{all} - Z_c}{2\pi f \frac{\mu_0}{\pi} \left(\frac{h}{w}\right)^{0.6}} \quad (8)$$

Then, the maximum allowable wiring length $l_{max}$ of the wiring length $l$ of the power supply wiring 100, which is required to make the power supply impedance $Z_{all}$ to be smaller than the target impedance $Z_T$ at the target frequency $f_T$, is acquired from equation (3):

$$l_{max} = \frac{Z_T - Z_c}{2\pi f_T \frac{\mu_0}{\pi} \left(\frac{h}{w}\right)^{0.6}} \quad (3)$$

In step S104, the maximum allowable wiring length $l_{max}$ of the wiring length $l$ may be acquired using equation (9), (10), or (11), which is a more simplified equation, instead of equation (3).

In step S106, results including the maximum allowable wiring length $l_{max}$ acquired in step S104 are displayed (see FIG. 4).

According to this embodiment, the inductance $L_0$ per unit length of the power supply wiring 100 is calculated on the basis of the width w of the power supply wiring 100 and the thickness h of the dielectric provided between the power supply wiring 100 and the ground plane. Thus, the inductance of the power supply wiring 100 can be easily acquired without advanced simulation. Furthermore, the wiring length $l$ of the power supply wiring 100 that allows the synthetic impedance $Z_{all}$ of the impedance $Z_P$, which is calculated from the inductance of the power supply wiring 100 set in accordance with the inductance $L_0$ per unit length of the power supply wiring 100 and the wiring length $l$ of the power supply wiring 100, and the impedance $Z_C$ of the capacitor 120 to be smaller than or equal to the target impedance $Z_T$ of the IC 110 at the target frequency $f_T$, can be acquired. That is, the arrangement can be set after a range in which the capacitor 120 can be arranged is understood. Thus, an appropriate arrangement of the capacitor 120 can be set more easily without a process of trial and error. Consequently, the development period of a circuit board on which the capacitor 120 is to be mounted can be reduced, and the development cost can thus be reduced.

Furthermore, according to this embodiment, with a relatively simple equation (1), the inductance $L_0$ per unit length of the power supply wiring 100 can be acquired. Thus, the inductance of the power supply wiring 100 can be acquired more easily without advanced simulation.

Furthermore, according to this embodiment, since the impedance of the capacitor 120 can be replaced with equation (6), the impedance of the capacitor 120 can be calculated only in view of the $ESL_{cap}$, and a more simple arithmetic operation can be achieved.

A variation of the first embodiment will now be explained. When a precision is not relatively required, equation (1) can be simplified to equation (2):

$$L_0 = \frac{\mu_0}{\pi} \sqrt{\frac{h}{w}} \quad (2)$$

Thus, the inductance $L_0$ per unit length of the power supply wiring 100 may be calculated using equation (2), instead of equation (1).

Furthermore, when the above-mentioned individual equations (3), (7), (8), and (9) to (11) are transformed on the basis of equation (2), equations provided below can be obtained. That is, equation (7) is transformed into equation (12):

$$Z_{all} = Z_p + Z_c = 2\pi f l \frac{\mu_0}{\pi} \sqrt{\frac{h}{w}} + Z_c \quad (12)$$

Equation (8) is transformed into equation (13):

$$l = \frac{Z_{all} - Z_c}{2\pi f \frac{\mu_0}{\pi} \sqrt{\frac{h}{w}}} \quad (13)$$

Equation (3) is transformed into equation (4):

$$l_{max} = \frac{Z_T - Z_c}{2\pi f_T \frac{\mu_0}{\pi} \sqrt{\frac{h}{w}}} \quad (4)$$

Equation (9) is transformed into equation (14):

$$l_{max} \cong 0.4 \frac{Z_T - Z_c}{f_T \sqrt{\frac{h}{w}}} \times 10^6 \quad (14)$$

Equation (10) is transformed into equation (15):

$$l_{max} = \frac{Z_T - 2\pi f_T ESL_{cap}}{2\pi f_T \frac{\mu_0}{\pi} \sqrt{\frac{h}{w}}} \quad (15)$$

Equation (11) is transformed into equation (16):

$$l_{max} \cong 0.4 \frac{Z_T - 2\pi f_T ESL_{cap}}{f_T \sqrt{\frac{h}{w}}} \times 10^6 \quad (16)$$

Thus, the maximum allowable wiring length $l_{max}$ may be calculated using any one of equations (4) and (14) to (16), instead of equation (3).

According to this variation, since an advanced power arithmetic operation is not required, an arithmetic operation can be performed more easily.

Second Embodiment

Figure 6:
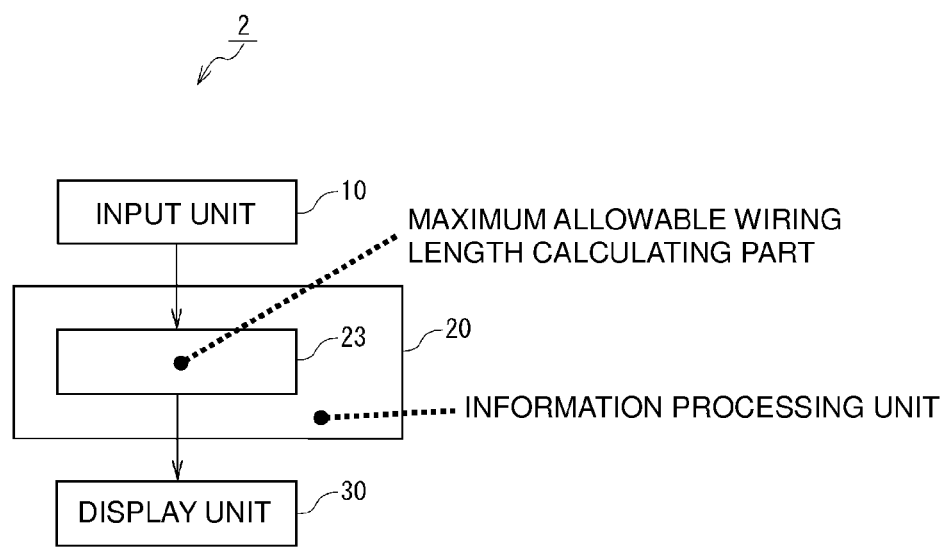
FIG. 6 is a block diagram illustrating the configuration of a capacitor arrangement assisting device according to a second embodiment.

The configuration of a capacitor arrangement assisting device 2 according to a second embodiment will now be explained with reference to FIG. 6. FIG. 6 is a block diagram illustrating the configuration of the capacitor arrangement assisting device 2. In FIG. 6, components the same as or similar to those in the first embodiment will be referred to with the same reference signs.

The capacitor arrangement assisting device 2 differs from the capacitor arrangement assisting device 1 described above in that the information processing unit 20 includes a maximum allowable wiring length calculating part 23, instead of the unit inductance calculating part 21 and the wiring length acquiring part 22. Since the other features of the configuration are the same as or similar to those of the capacitor arrangement assisting device 1 described above, a detailed explanation will be omitted here. In this embodiment, the input unit 10 functions as an input means, and the display unit 30 functions as a display means.

The maximum allowable wiring length calculating part 23 calculates the maximum allowable wiring length $l_{max}$ of the power supply wiring 100, using equation (3), on the basis of the width w of the power supply wiring 100, the thickness h of the dielectric provided between the power supply wiring 100 and the ground plane, the impedance $Z_C$ of the capacitor 120 (or the $ESL_{cap}$), and the target impedance $Z_T$ of the IC 110 at the target frequency $f_T$, which are input from the input unit 10:

$$l_{max} = \frac{Z_T - Z_c}{2\pi f_T \frac{\mu_0}{\pi} \left(\frac{h}{w}\right)^{0.6}} \quad (3)$$

That is, the maximum allowable wiring length calculating part 23 functions as a maximum allowable wiring length calculating means.

The maximum allowable wiring length $l_{max}$ may be calculated using equation (9), (10), or (11), which is a more simplified equation, instead of equation (3). In addition, calculation results including the calculated maximum allowable wiring length $l_{max}$ and others are displayed by the display unit 30.

Figure 7:
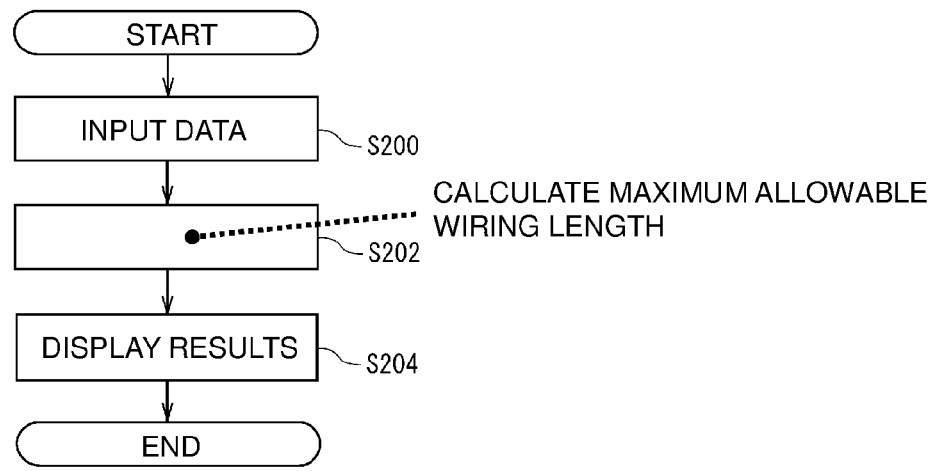
FIG. 7 is a flowchart illustrating the processing procedure of a maximum allowable wiring length calculating process by the capacitor arrangement assisting device according to the second embodiment.

The operation of the capacitor arrangement assisting device 2 and a capacitor arrangement assisting method will now be explained with reference to FIG. 7. FIG. 7 is a flowchart illustrating the processing procedure of a maximum allowable calculating process by the capacitor arrangement assisting device 2.

In step S200, data entered by a user, such as the width w of the power supply wiring 100, the thickness h of the dielectric between the power supply wiring 100 and the ground plane, the impedance $Z_C$ of the capacitor 120 (or the $ESL_{cap}$), and the target frequency $f_T$ and the target impedance $Z_T$ of the IC 110, are received.

In step S202 (corresponding to a maximum allowable wiring length calculating step), the maximum allowable wiring length $l_{max}$ of the power supply wiring 100 is calculated, using equation (3) (or equation (9), (10), or (11)), on the basis of the width w of the power supply wiring 100, the thickness h of the dielectric, the impedance $Z_C$ of the capacitor 120 (or the $ESL_{cap}$), and the target impedance $Z_T$ of the IC 110 at the target frequency $f_T$, which are received in step S200:

$$l_{max} = \frac{Z_T - Z_c}{2\pi f_T \frac{\mu_0}{\pi} \left(\frac{h}{w}\right)^{0.6}} \quad (3)$$

A designer can design the power supply impedance to be smaller than or equal to the target impedance $Z_T$ by arranging the capacitor 120 in such a manner that the wiring length l is smaller than or equal to the maximum allowable wiring length l.

In step S204, results including the maximum allowable wiring length $l_{max}$ calculated in step S202 and others are displayed (see FIG. 4).

According to this embodiment, when specific data including the width w of the power supply wiring 100 and the thickness h of the dielectric and others are input, the maximum allowable wiring length $l_{max}$ of the power supply wiring 100, that is, a range in which the capacitor 120 can be arranged, is directly calculated using equation (3) and displayed. Thus, an appropriate arrangement of the capacitor 120 can be set more easily without a process of trial and error. Consequently, the development period of a circuit board on which the capacitor 120 is to be mounted can be reduced, and the development cost can thus be reduced.

Furthermore, according to this embodiment, by expressing the permeability $\mu_0$ of a vacuum as a round number and simplifying equation (3), an arithmetic equation to be used for calculating the maximum allowable wiring length $l_{max}$ can be more simplified, and an arithmetic operation can be performed more easily.

According to this embodiment, by replacing the impedance $Z_C$ of the capacitor 120 with equation (6), the impedance of the capacitor 120 can be calculated only in view of the $ESL_{cap}$. Thus, an arithmetic operation can be performed more easily.

Here, in order to confirm effects of the capacitor arrangement assisting device 2 or the capacitor arrangement assisting method according to this embodiment, the maximum allowable wiring length $l_{max}$ was calculated by changing the width w of the power supply wiring 100, the thickness h of the dielectric, the target frequency $f_T$, and the target impedance $Z_T$. In addition, the capacitor 120 was arranged in accordance with the calculation results, and the power supply impedance was measured (Examples 1 to 5). FIGS. 8 to 12 illustrate measurement results of the impedance in the Examples 1 to 5. In the graphs illustrated in FIGS. 8 to 12, the horizontal axis represents frequency (MHz) and the vertical axis represents impedance (Ω). A monolithic ceramic capacitor of 1 μF was used in measurement. Furthermore, in arithmetic operations, the $ESL_{cap}$ was set to 0.6 nH, and the maximum allowable wiring length $l_{max}$ was calculated using equation (11):

$$l_{max} \cong 0.4 \frac{Z_T - 2\pi f_T ESL_{cap}}{f_T \left(\frac{h}{w}\right)^{0.6}} \times 10^6 \quad (11)$$

Example 1

Figure 8:
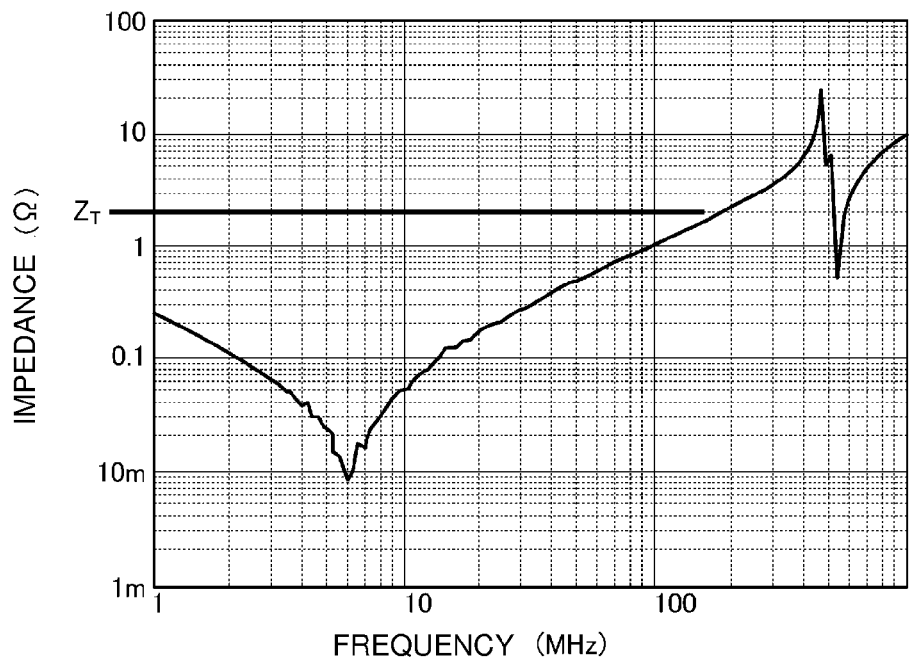
FIG. 8 is a graph illustrating measurement results in Example 1.

In Example 1, a four-layer multilayer board was assumed. The power supply wiring 100 whose width w was 1 mm and whose distance to the ground plane (thickness of the dielectric) h was 0.4 mm, was designed in such a manner that the target frequency $f_T$ was 150 MHz and the target impedance $Z_T$ was smaller than or equal to 2Ω. In a calculation result by equation (11), the maximum allowable wiring length $l_{max}$ was calculated to be 6.6 mm. In accordance with this result, in the measurement, the capacitor 120 was arranged at the position 6.0 mm away from the power supply terminal 110a of the IC 110. As a result, the measured power supply impedance was 1.9Ω at 150 MHz, as illustrated in FIG. 8, and it was confirmed that the measured power supply impedance was smaller than or equal to the target impedance $Z_T$.

Example 2

Figure 9:
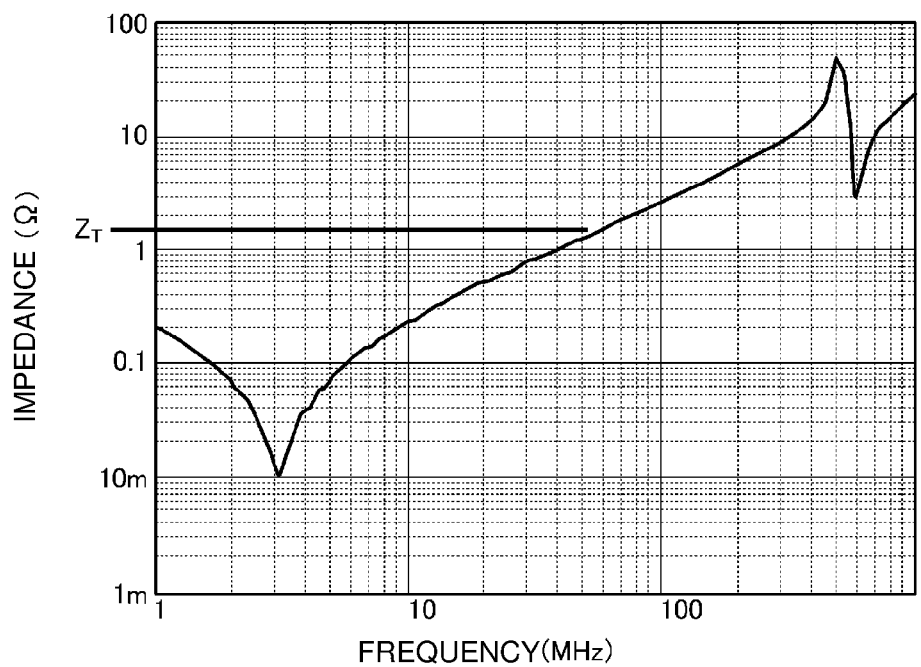
FIG. 9 is a graph illustrating measurement results in Example 2.
Figure 10:
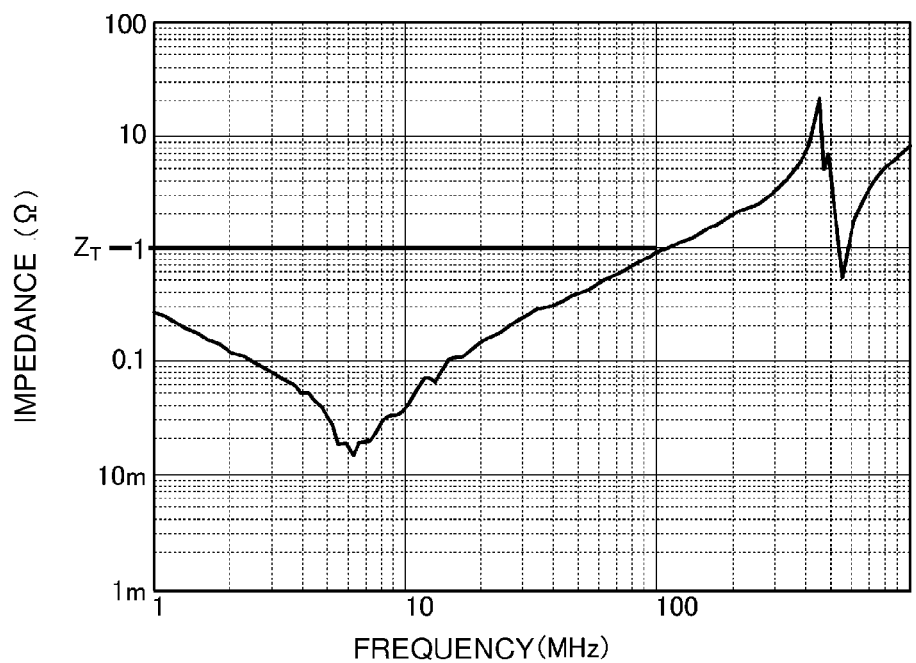
FIG. 10 is a graph illustrating measurement results in Example 3.
Figure 11:
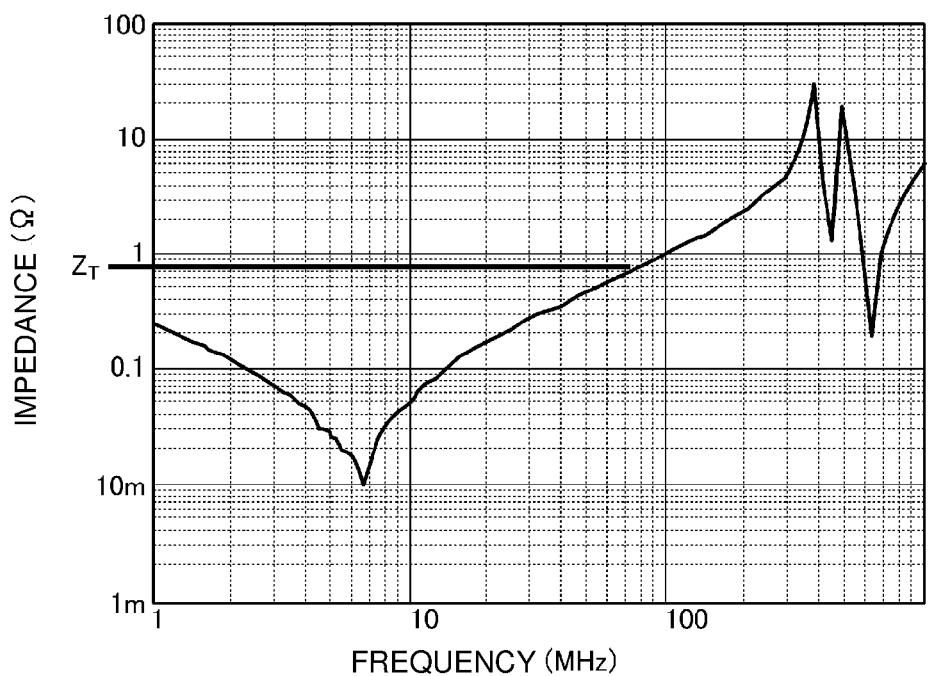
FIG. 11 is a graph illustrating measurement results in Example 4.
Figure 12:
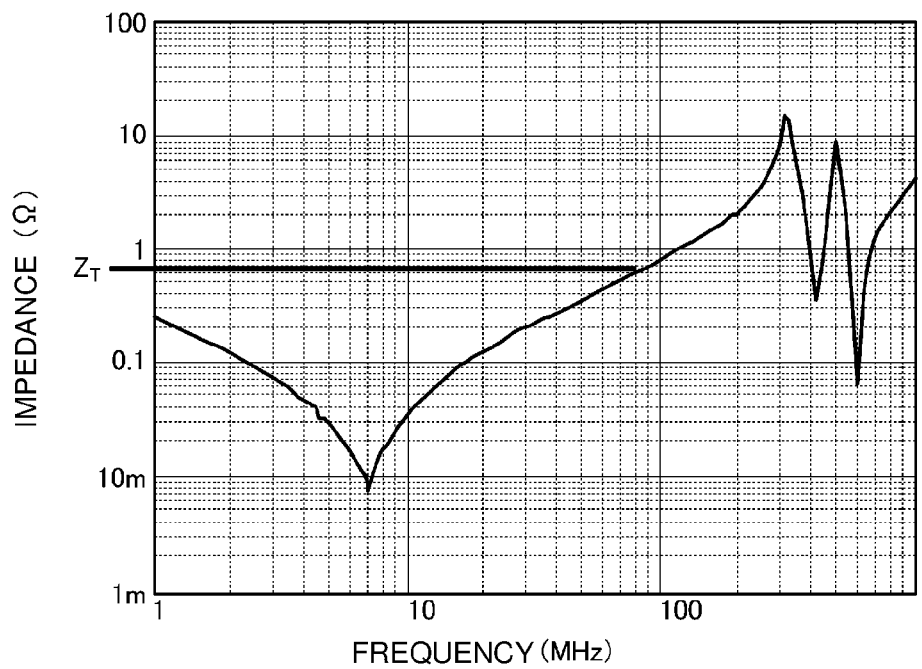
FIG. 12 is a graph illustrating measurement results in Example 5.
Figure 13:
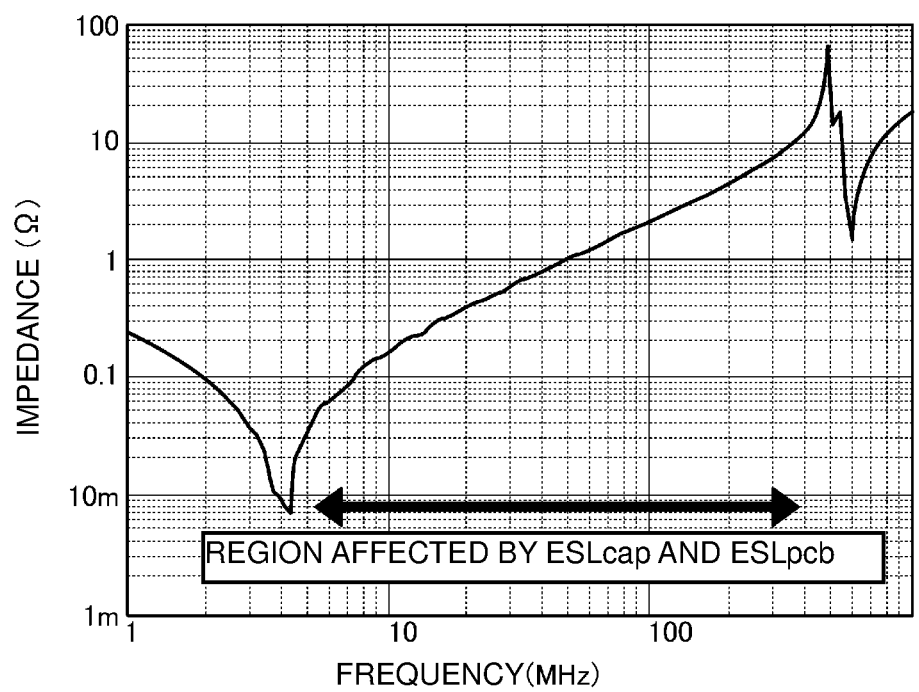
FIG. 13 is a graph illustrating the frequency characteristics of power supply impedance.

In Example 2, a double-sided board was assumed. The power supply wiring 100 whose width w was 1 mm and whose distance to the ground plane (thickness of the dielectric) h was 1.2 mm, was designed in such a manner that the target frequency $f_T$ was 50 MHz and the target impedance $Z_T$ was smaller than or equal to 1.5Ω. In a calculation result by equation (11), the maximum allowable wiring length $l_{max}$ was calculated to be 9.4 mm. In accordance with this result, in the measurement, the capacitor 120 was arranged at the position 9.0 mm away from the power supply terminal 110a of the IC 110. As a result, the measured power supply impedance was 1.4Ω at 50 MHz, as illustrated in FIG. 9, and it was confirmed that the measured power supply impedance was smaller than or equal to the target impedance $Z_T$.

Example 3

In Example 3, a six-layer multilayer board was assumed. The power supply wiring 100 whose width w was 2 mm and whose distance to the ground plane (thickness of the dielectric) h was 0.2 mm, was designed in such a manner that the target frequency $f_T$ was 100 MHz and the target impedance $Z_T$ was smaller than or equal to 1Ω. In a calculation result by equation (11), the maximum allowable wiring length $l_{max}$ was calculated to be 9.9 mm. In accordance with this result, in the measurement, the capacitor 120 was arranged at the position 9.0 mm away from the power supply terminal 110a of the IC 110. As a result, the measured power supply impedance was 0.9Ω at 100 MHz, and it was confirmed that the measured power supply impedance was smaller than or equal to the target impedance $Z_T$.

Example 4

In Example 4, a power supply wiring through which large current passes was assumed. The power supply wiring 100 whose width w was 5 mm and whose distance to the ground plane (thickness of the dielectric) h was 0.2 mm, was designed in such a manner that the target frequency $f_T$ was 70 MHz and the target impedance $Z_T$ was smaller than or equal to 0.8Ω. In a calculation result by equation (11), the maximum allowable wiring length $l_{max}$ was calculated to be 21.1 mm. In accordance with this result, in the measurement, the capacitor 120 was arranged at the position 21.0 mm away from the power supply terminal 110a of the IC 110. As a result, the measured power supply impedance was 0.73Ω at 70 MHz, and it was confirmed that the measured power supply impedance was smaller than or equal to the target impedance $Z_T$.

Example 5

In Example 5, a power supply wiring through which much larger current passes was assumed. The power supply wiring 100 whose width w was 10 mm and whose distance to the ground plane (thickness of the dielectric) h was 0.2 mm, was designed in such a manner that the target frequency $f_T$ was 80 MHz and the target impedance $Z_T$ was smaller than or equal to 0.7Ω. In a calculation result by equation (11), the maximum allowable wiring length $l_{max}$ was calculated to be 20.8 mm. In accordance with this result, the capacitor was arranged at the position 21.0 mm away from the power supply terminal 110a of the IC 110. As a result, the measure power supply impedance was 0.67Ω at 80 MHz, and it was confirmed that the measured power supply impedance was smaller than or equal to the target impedance $Z_T$. As described above, according to this embodiment, it was confirmed that appropriate maximum allowable wiring lengths $l_{max}$ can be acquired for various cross-section sizes (the width w and the thickness h of the dielectric) and the target impedances $Z_T$.

As described above, when a precision is not relatively required, equation (1) can be simplified to equation (2):

$$L_0 = \frac{\mu_0}{\pi}\sqrt{\frac{h}{w}} \qquad (2)$$

With equation (2), equation (11) can be transformed into equation (16):

$$l_{max} \cong 0.4 \frac{Z_T - 2\pi f_T ESL_{cap}}{f_T \sqrt{\frac{h}{w}}} \times 10^6 \qquad (16)$$

Thus, the maximum allowable wiring length $l_{max}$ may be calculated using equation (16).

Here, comparison between results of calculation of the maximum allowable wiring length $l_{max}$ under the conditions of Examples 1 to 5 described above using equation (16) (for distinction, hereinafter, referred to as the "maximum allowable wiring length $l_{max}2$") and results of calculation using equation (11), will be illustrated in Table 1.

TABLE 1

| | Conditions | | | | | | Difference |
|---|---|---|---|---|---|---|---|
| | w (mm) | h (mm) | $Z_T$ (Ω) | $f_T$ (MHz) | $l_{max}$ (mm) | $l_{max}2$ (mm) | $l_{max}2/l_{max}$ |
| Example 1 | 1 | 0.4 | 2 | 150 | 6.6 | 6.0 | 0.90 |
| Example 2 | 1 | 1.2 | 1.5 | 50 | 9.4 | 9.5 | 1.01 |
| Example 3 | 2 | 0.2 | 1 | 100 | 9.9 | 7.8 | 0.79 |
| Example 4 | 5 | 0.2 | 0.8 | 70 | 21.0 | 15.2 | 0.72 |
| Example 5 | 10 | 0.2 | 0.7 | 80 | 20.7 | 14.0 | 0.68 |

As illustrated in Table 1, in the case of the maximum allowable wiring length $l_{max}2$, which can be calculated by a simpler arithmetic operation, a calculation result tends to be a little smaller than a calculation result for the maximum allowable wiring length $l_{max}$. However, in the case where the capacitor 120 is arranged on the basis of the maximum allowable wiring length $l_{max}2$, the power supply impedance tends to be smaller, that is, tends to be on the safer side. Thus, the calculation result of the maximum allowable wiring length $l_{max}2$ is allowable.

As described above, in the case of using equation (16), although precision is slightly lower than the case using equation (11), an arithmetic operation can be easily performed. Thus, an appropriate arrangement of the capacitor 120 can be set more easily.

Although embodiments of the present invention have been described above, the present invention is not limited to the embodiments described above. Various changes may be made to the present invention. For example, in a variation of the second embodiment, the maximum allowable wiring length $l_{max}2$ is calculated using equation (16). However, equation (4), (14), or (15) may be used, instead of equation (16). Furthermore, for example, the shape of the power supply wiring 100 and the like are not limited to the embodiments described above.

REFERENCE SIGNS LIST 1,2 capacitor arrangement assisting device
10 input unit
20 information processing unit
21 unit inductance calculating part
22 wiring length acquiring part
23 maximum allowable wiring length calculating part
30 display unit
100 power supply wiring
110 IC
120 capacitor
130 via

The invention claimed is:

1. A capacitor arrangement assisting method comprising:
calculating by using a computer, on the basis of a width of a power supply wiring that connects a power supply terminal of an IC with a capacitor and a thickness of a dielectric provided between the power supply wiring and a ground plane, an inductance per unit length of the power supply wiring; and
determining a wiring length of the power supply wiring such that a synthetic impedance, based on an impedance of the power supply wiring and an impedance of the capacitor, is smaller than or equal to a target impedance of the IC at a target frequency,
wherein the impedance of the power supply wiring is calculated from an inductance of the power supply wiring set in accordance with the inductance per unit length of the power supply wiring and the wiring length of the power supply wiring,
wherein the inductance per unit length of the power supply wiring is calculated as follows:

$$L_0 = \frac{\mu_0}{\pi}\left(\frac{h}{w}\right)^{0.6},$$

where $L_0$ represents the inductance per unit length of the power supply wiring, h represents the thickness of the dielectric, w represents the width of the power supply wiring, and $\mu_0$ represents the permeability of a vacuum.

2. The capacitor arrangement assisting method according to claim 1, wherein the impedance of the capacitor is calculated on the basis of an equivalent series inductance of the capacitor.

3. A capacitor arrangement assisting method comprising:
calculating by using a computer, on the basis of a width of a power supply wiring that connects a power supply terminal of an IC with a capacitor and a thickness of a dielectric provided between the power supply wiring and a ground plane, an inductance per unit length of the power supply wiring; and
determining a wiring length of the power supply wiring such that a synthetic impedance, based on an impedance of the power supply wiring and an impedance of the capacitor, is smaller than or equal to a target impedance of the IC at a target frequency,
wherein the impedance of the power supply wiring is calculated from an inductance of the power supply wiring set in accordance with the inductance per unit length of the power supply wiring and the wiring length of the power supply wiring,
wherein the inductance per unit length of the power supply wiring is calculated as follows:

$$L_0 = \frac{\mu_0}{\pi}\sqrt{\frac{h}{w}},$$

where $L_0$ represents the inductance per unit length of the power supply wiring, h represents the thickness of the dielectric, w represents the width of the power supply wiring, and $\mu_0$ represents the permeability of a vacuum.

4. The capacitor arrangement assisting method according to claim 3, wherein the impedance of the capacitor is calculated on the basis of an equivalent series inductance of the capacitor.

5. A capacitor arrangement assisting device comprising:
unit inductance calculating unit that calculates with a processor, on the basis of a width of a power supply wiring that connects a power supply terminal of an IC with a capacitor and a thickness of a dielectric provided between the power supply wiring and a ground plane, an inductance per unit length of the power supply wiring; and
wiring length acquiring unit that determines a wiring length of the power supply wiring such that a synthetic impedance, based on an impedance of the power supply wiring and an impedance of the capacitor, is smaller than or equal to a target impedance of the IC at a target frequency,
wherein the impedance of the power supply wiring is calculated from an inductance of the power supply wiring set in accordance with the inductance per unit length of the power supply wiring and the wiring length of the power supply wiring,
wherein the unit inductance calculating unit calculates the inductance $L_0$ per unit length of the power supply wiring as follows:

$$L_0 = \frac{\mu_0}{\pi}\left(\frac{h}{w}\right)^{0.6},$$

where h represents the thickness of the dielectric, w represents the width of the power supply wiring, and $\mu_0$ represents the permeability of a vacuum.

6. The capacitor arrangement assisting device according to claim 5, wherein the impedance of the capacitor is calculated on the basis of an equivalent series inductance of the capacitor.

7. A capacitor arrangement assisting device comprising:
unit inductance calculating unit that calculates with a processor, on the basis of a width of a power supply wiring that connects a power supply terminal of an IC with a capacitor and a thickness of a dielectric provided between the power supply wiring and a ground plane, an inductance per unit length of the power supply wiring; and
wiring length acquiring unit that determines a wiring length of the power supply wiring such that a synthetic impedance, based on an impedance of the power supply wiring and an impedance of the capacitor, is smaller than or equal to a target impedance of the IC at a target frequency,
wherein the impedance of the power supply wiring is calculated from an inductance of the power supply wiring set in accordance with the inductance per unit length of the power supply wiring and the wiring length of the power supply wiring, wherein the unit inductance calculating unit calculates the inductance $L_0$ per unit length of the power supply wiring as follows:

$$L_0 = \frac{\mu_0}{\pi}\sqrt{\frac{h}{w}},$$

where h represents the thickness of the dielectric, w represents the width of the power supply wiring, and $\mu_0$ represents the permeability of a vacuum.

8. The capacitor arrangement assisting device according to claim 7, wherein the impedance of the capacitor is calculated on the basis of an equivalent series inductance of the capacitor.

* * * * *